(12) United States Patent
Sheraizin et al.

(10) Patent No.: US 6,753,929 B1
(45) Date of Patent: Jun. 22, 2004

(54) METHOD AND SYSTEM FOR REAL TIME MOTION PICTURE SEGMENTATION AND SUPERPOSITION

(75) Inventors: Semion M. Sheraizin, Mazkeret Batya (IL); Vitaly S. Sheraizin, Mazkeret Batya (IL)

(73) Assignee: VLS Com Ltd., Rechovot (IL)

( * ) Notice: Subject to any disclaimer, the term of this patent is extended or adjusted under 35 U.S.C. 154(b) by 455 days.

(21) Appl. No.: 09/699,374

(22) Filed: Oct. 31, 2000

Related U.S. Application Data

(60) Provisional application No. 60/214,439, filed on Jun. 28, 2000.

(51) Int. Cl.[7] ................................................ H04N 9/74
(52) U.S. Cl. ....................... 348/586; 348/598; 348/599
(58) Field of Search ................................ 348/586, 587, 348/590, 591, 592, 593, 598, 584, 239, 599; H04N 9/74

(56) References Cited

U.S. PATENT DOCUMENTS

| | | | |
|---|---|---|---|
| 3,961,133 A | | 6/1976 | Bennett |
| 4,947,255 A | | 8/1990 | Jackson et al. |
| 5,126,847 A | * | 6/1992 | Kori et al. ................... 348/239 |
| 5,301,016 A | | 4/1994 | Gehrmann |
| 5,488,675 A | | 1/1996 | Hanna |
| 5,491,517 A | | 2/1996 | Kreitman et al. |
| 5,539,475 A | | 7/1996 | Sajadian et al. |
| 5,566,251 A | | 10/1996 | Hanna et al. |
| 5,914,748 A | * | 6/1999 | Parulski et al. .............. 348/239 |

FOREIGN PATENT DOCUMENTS

| | | |
|---|---|---|
| GB | 1503612 | 3/1978 |
| JP | 55-71363 | 5/1980 |
| JP | 4-83480 | 3/1992 |
| JP | 6-133221 | 5/1994 |

OTHER PUBLICATIONS

Richard Brice, *Multimedia and Virtual Reality Engineering*, 1997, pp. 1–8, 174–175, 280–283, Newnes.

Lynn Conway and Charles J. Cohen, "Video Mirroring and Iconic Gestures: Enhancing Basic Videophones to Provide Visual Coaching and Visual Control", *IEEE Transactions on Consumer Electronics*, vol. 44, No. 2, pp. 388–397, May 1998.

Andrew G. Tescher, "Multimedia is the Message", *IEEE Signal Processing Magazine*, vol. 16, No. 1, pp. 44–54, Jan. 1999.

Eugene Leonard, "Considerations Regarding the Use of Digital Data To Generate Video Backgrounds", *SMPTE Journal*, vol. 87, pp. 499–504, Aug. 1978.

\* cited by examiner

*Primary Examiner*—Michael H. Lee
(74) *Attorney, Agent, or Firm*—Eitan, Pearl, Latzer & Cohen Zedek, LLP

(57) ABSTRACT

Methods and systems for separating a picture part of interest from an arbitrary background in real time videos are presented. The background may be a moving or still frame. The picture part of interest and background frames may be in or out of focus. One separation approach employs the difference between luminance and chrominance values of the input and background frames where changes in luminance from frame to frame are compensated for. In another approach, picture part of interest separation is based solely on spatial resolution differences between the background and the picture part of interest frames. The present invention also teaches a method and system for parameter matching of the picture part of interest and the basic picture into which the picture part of interest is embedded. The invention further teaches a method and system for embedding a separated picture part of interest into a basic picture containing text.

6 Claims, 8 Drawing Sheets

METHOD AND SYSTEM FOR REAL TIME MOTION PICTURE SEGMENTATION AND SUPERPOSITION

This application claims the benefit of Provisional application Ser. No. 60/214,439, filed Jan. 28, 2000.

FIELD OF THE INVENTION

The present invention relates generally to processing video images and, in particular, to picture segmentation and superposition of real time motion pictures.

BACKGROUND OF THE INVENTION

The problem of combining parts from different images to create a new superpositioned picture can be decomposed into the following steps: picture segmentation, positioning and scaling, light and spatial parameter matching and superposition of video image parts. As is well known, picture segmentation is a formidable problem.

Picture segmentation involves separating the picture part of interest (PPI) from other parts of an image. These latter parts are called the background (BG). The separated picture part of interest is then embedded into another picture, called the basic picture (BP).

At present, picture part of interest separation from a background is based on either chroma-key, luma-key or code key methods. However, these background keys generally require specific room, studio or light conditions or a priori information about the position of the PPI in the given frame. Therefore, their use is unsuitable for many applications where these standardized conditions can not be or are usually difficult to meet.

Much research has been carried out trying to improve picture segmentation. The following patents discuss various aspects of prior art methods in this field:

U.S. Pat. Nos. 3,961,133, 5,301,016; 5,491,517; 5,566,251; Japanese Patents 4-83480, 6-133221, 55-71363 and Great Britain Patent 1,503,612.

The following articles and books also deal with the subject:

Richard Brice, *Multimedia and Virtual Reality Engineering*, 1997, Newnes, 307

Lynn Conway and Charles J. Cohen, "Video Mirroring and Iconic Gestures: Enhancing Basic Videophones to Provide Visual Coaching and Visual Control", *IEEE Transactions On Consumer Electronics*, vol. 44, No. 2, p. 388–397, May 1998;

Andrew G. Tescher, "Multimedia is the Message", *IEEE Signal Processing Magazine*, vol. 16, No 1., pp. 44–54, January 1999; and Eugene Leonard, "Considerations Regarding The Use Of Digital Data To Generate Video Backgrounds", *SMPTE Journal*, vol. 87, pp. 499–504, August 1978,

SUMMARY OF THE INVENTION

The present invention relates to processing video images and, in particular, to picture segmentation and superposition of real time motion pictures. The images processed can be in arbitrary, non-standardized backgrounds. The images can be video images with the picture part of interest moving in and out of focus. In some embodiments, the background used for superposition generally are still images, while in others the background can be moving images. The system can operate in real time with the signals being processed pixel-by-pixel, line-by-line, and frame-by-frame. There are no processing interruptions and video signal loss.

The present invention describes a method for image processing of a frame. The method includes the step of separating a picture part of interest from the frame, where the frame has an arbitrary background. In another embodiment, the above separating step may further include the steps of receiving a background frame having an arbitrary background, receiving an input frame having a picture part of interest within an arbitrary background, and separating the picture part of interest from the arbitrary background using the input and background frames.

The method of the invention may use a background frame that is a still or moving image. The method may include a background frame or a picture part of interest that is out of focus.

In an embodiment of the present invention, the step of separating includes the step of spatially separating the picture part of interest and background of the input frame.

In another embodiment of the invention, the step separating further includes the step of generating the difference between luminance and chrominance signal values of the input and background frames.

According to another embodiment, the step of separating further comprises the steps of filtering an input signal, estimating the pulse signal maximum of the filtered input signal, and determining the time difference between adjacent pulse signal maxima of the input signal. This is followed by comparing the time difference to a threshold value, and accepting a signal for use as part of a picture part of interest mask if the signal is below the threshold value. The above steps generally are applied separately to the luminance, red chrominance and blue chrominance components of the input signal.

According to one aspect of the invention, a system is taught for separating a picture part of interest of an input frame. The input frame has an arbitrary background. The system comprises a mask generating unit for generating a picture part of interest mask using the difference between chrominance and luminance signal values in the input frame and an arbitrary background frame. The system also includes a separator unit for separating a picture part of interest from the input frame using the picture part of interest mask.

In another embodiment, the mask generating unit further comprises a luminance compensation unit for compensating for changes in background luminance signal when going from frame to frame. The unit also includes a means for generating a picture part of interest by removing the compensated background luminance signal from a picture part of interest in an arbitrary background signal.

In yet another embodiment of the present invention, the above mask generating unit further comprises a means for generating a chrominance signal for a picture part of interest by subtracting out a background chrominance signal from the picture part of interest in an arbitrary background signal.

According to another embodiment, the above mask generating unit further comprises a background luminance frame memory for providing a background luminance signal, a first divider for dividing luminance signals from an input frame and a memorized background luminance signal (quotient A), the memorized background luminance being provided by the background luminance frame memory. The mask generating unit also includes a second switch receiving a luminance window from a window pulse generator unit and quotient A from the first divider. The mask generating unit further includes an averaging circuit for calculating an estimated light change coefficient K by averaging quotient A over the pixels of the luminance window. There is also a second divider for detecting changes in the input frame luminance signal by dividing an input frame luminance signal by the light change coefficient K (quotient B), and a first summer for subtracting the quotient B from the memorized background luminance signal.

In still another embodiment the mask generating unit further comprises a background chrominance frame memory for providing a memorized background chrominance ratio signal, the memory being set up by a switch. It also includes a divider for dividing red and blue chrominance signals (quotient C), the chrominance signals received from a color unit, and a summer for subtracting the quotient C from the memorized background chrominance ratio signal.

In yet another embodiment of the present invention, the separator unit of the system comprises a time aligner for aligning color signals of the input frame, and a switch receiving the time aligned input frame color signals, and a picture part of interest mask from the mask generating unit. The switch generates a picture part of interest from the mask and the color signals.

Another aspect of the invention teaches a system for separating a picture part of interest from an input frame having an arbitrary background where the system includes at least one high pass filter for determining the edges of an input signal of the picture part of interest within the arbitrary background, at least one pulse signal maximum estimator for determining the time maxima of the filtered input signal, and at least one maximum-to-maximum time determiner for determining the time difference between consecutive signal maxima. The system also includes at least one comparator for comparing the time difference with a predetermined threshold value, and an OR gate for generating a picture part of interest mask from signals received from the at least one comparator.

In a further embodiment, the preceding system processes the luminance, red chrominance, and blue chrominance signals of the input signal separately. Each of the signals is processed by its own high pass filter, pulse signal maximum estimator, time determiner, and comparator.

The present invention also teaches a method for text detection for use in superpositioning a video image in a basic picture containing text. The method comprises the steps of storing signal data from a plurality of input frames, the data being selected based on predetermined criteria, the storage being effected on a pixel by pixel basis. The method further includes decoding a stored input frame by determining the number of consecutive stored frames that have text at a predetermined pixel position, and determining the number of pixels with text in a given frame and comparing the number to a predetermined criteria. A text is determined to exist if a sufficient number of pixels in enough consecutive frames have met the predetermined criteria.

The present invention further teaches a system for positioning a picture part of interest in a basic picture where the basic picture contains text. The system includes a text detector unit for generating a text mask from a luminance signal of a window mask of the basic picture, a scaler for scaling a separated picture part of interest, the scaling being controlled by a background/foreground controller, and a means for embedding the scaled picture part of interest in the text mask.

In yet another embodiment the text detector of the above system further comprises a frame storage unit for storing filtered signals on a pixel-by-pixel basis for each frame, a decoder for determining the number of consecutive stored frames which have text in corresponding pixel positions, and a counter for counting the number of pixels in each of the stored frames.

Another aspect of the present invention teaches a method for superpositioning a picture part of interest in a basic picture. The method includes the step of matching parameters between the basic picture and the picture part of interest where the parameters consist of at least one of the following: luminance, chrominance and spatial resolution.

In one embodiment of the invention, a system is taught for matching parameters of a separated picture part of interest and a basic picture when superpositioning the picture part of interest in the basic picture. The system comprises a luminance matching unit for matching luminance signals of the basic picture and the picture part of interest, a chrominance matching unit for matching chrominance signals of the basic picture and the picture part of interest, and a spatial resolution matching unit for spatially resolving the basic picture and the picture part of interest using the luminance and matched luminance signals of the basic picture and the picture part of interest.

According to another embodiment of the invention, the above system comprises a spatial resolution matching unit which further comprises a means for delaying a basic picture luminance signal for one and more than one arbitrary time units and comparing these delayed signals after subtracting out the original basic picture luminance. It also includes a means for time aligning a matched luminance signal where the matching is effected for the basic picture and picture part of interest luminances and a means for filtering a matched basic picture and picture part of interest luminance. It further includes at least one switch for receiving either the once or the more than once delayed basic picture luminance and the time aligned and filtered matched luminance for producing a matched spatially resolved basic picture and picture part of interest.

In another embodiment of the present invention, the spatial resolution matching unit comprises a first memory pixel for delaying a basic picture luminance signal by one time unit, a first summer for subtracting the once delayed luminance signal from the basic picture luminance signal, a second memory pixel connected to the first memory pixel for delaying a basic picture luminance signal by a second time unit, and a second summer for subtracting the twice delayed luminance signal from the basic picture luminance signal. It also includes a comparator for comparing the signal intensities of the differences between the once and twice delayed signals (S2) and the basic picture luminance signal (S1), a time aligner for aligning a luminance matched picture part of interest signal (S3), two low pass filters, one for filtering the luminance matched picture part of interest signal (S4) when the basic picture is out of focus and the second for filtering a luminance matched picture part of interest signal (S5) when the picture part of interest is positioned in the background. The matching unit further includes a first switch for determining an acceptable luminance signal from among the filtered, aligned and compared signals (S1, S2, S3, S4). A controller for controlling the positioning of the picture part of interest depending on whether the picture part of interest is to be placed in the foreground or background, is also present. Finally, the unit includes a second switch for producing a mask from the luminance signal data and foreground-background information received from the first switch, the controller and luminance matched picture part of interest (S5) from the luminance matching unit.

In the text below and the accompanying figures, the following abbreviations are used:

PPI—Picture part of interest;
BG—Background;
BP—Basic picture;
PPIABG—Picture part of interest in arbitrary background;
EP—Embedded picture;
LPF—Low pass filter;
HPF—High pass filter;
CA—Comparator;
SW—Switch;
R—Red component signal;
B—Blue component signal;
G—Green component signal;
Y—Luminance signal;
Cr—Red color difference (chrominance) signal (R-Y);
Cb—Blue color difference (chrominance) signal (B-Y);
SBGY—Stored background luminance frame;
SBG(Cr/Cb)—Stored background chrominance ratio frame;
VD—Vertical drive;
HD—Horizontal drive; and
MP—Memory pixel.

BRIEF DESCRIPTION OF THE DRAWINGS

The present invention will be understood and appreciated more fully from the following detailed description taken in conjunction with the appended drawings in which.

Similar parts in different Figures are given similar numbers.

DETAILED DESCRIPTION OF THE PRESENT INVENTION

The present invention relates to systems and methods for separating a picture part of interest (PPI) from an arbitrary, rather than a standardized, background (BG). Invariant background parameters are generally not required; the parameters used by chroma-key, luma-key, code-key, and other conventional methods for determining background are generally unnecessary. Two picture part of interest separation methods are described herein: a method of separation using a still image background and a method using the difference in spatial resolution difference between the picture part of interest and the background. In the latter method, the background can be either a still or moving image.

The invention also provides a method for embedding text in a background. Finally, a method for matching parameters of the picture part of interest and basic picture parameters to facilitate superposition of the former in the latter is discussed.

Figure 1:
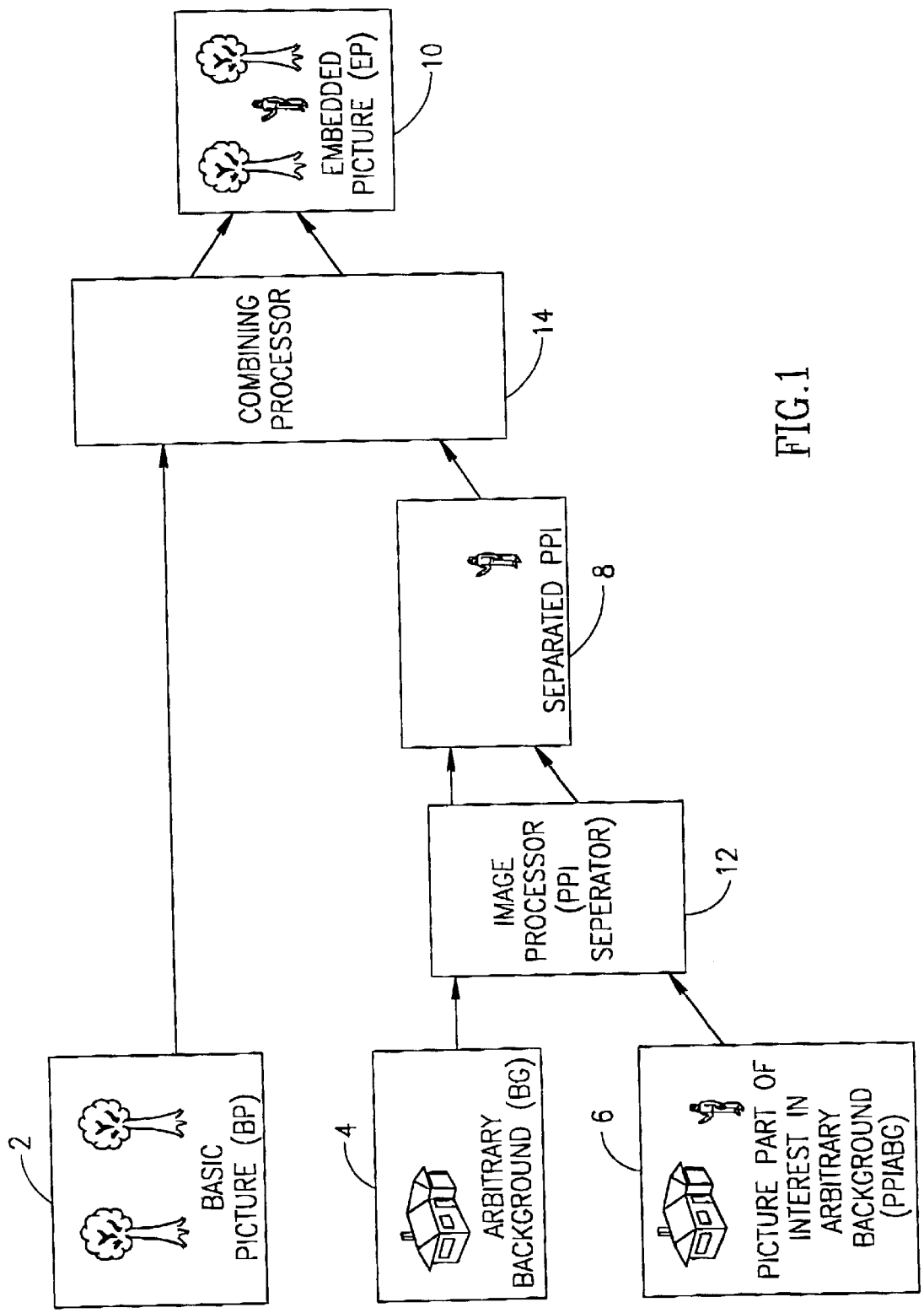
FIG. 1 is a schematic illustration of the superposition process according to the present invention.

Reference is now made to FIG. 1, where an overview of the entire superposition process is shown. The Figure presents a basic picture (BP) 2, a background picture (BG) 4, a picture part of interest in an arbitrary background (PPIABG) 6, an image processor 12, a separated picture part of interest (PPI) 8, a combining processor 14 and a final superpositioned picture, also referred to as an embedded picture (EP) 10. PPIABG 6 comprises BG 4 and PPI 8.

In the present invention, basic picture (BP) 2 and picture part of interest in an arbitrary background (PPIABG) 6 can be still images or moving video images with an arbitrary background. Background (BG) 4 is a still image in the first separation method described hereinbelow. In the second method, BG 4 can be either a still or moving image.

Background (BG) 4 and PPIABG 6 are provided to image processor 12 where the background (BG) 4 is removed from PPIABG 6 to form picture part of interest (PPI) 8 according to one of the two methods described hereinbelow. Basic picture (BP) 2 and separated picture part of interest (PPI) 8 are then fed into combining processor 14 where the two are superpositioned to form embedded picture (EP) 10.

Figure 2:
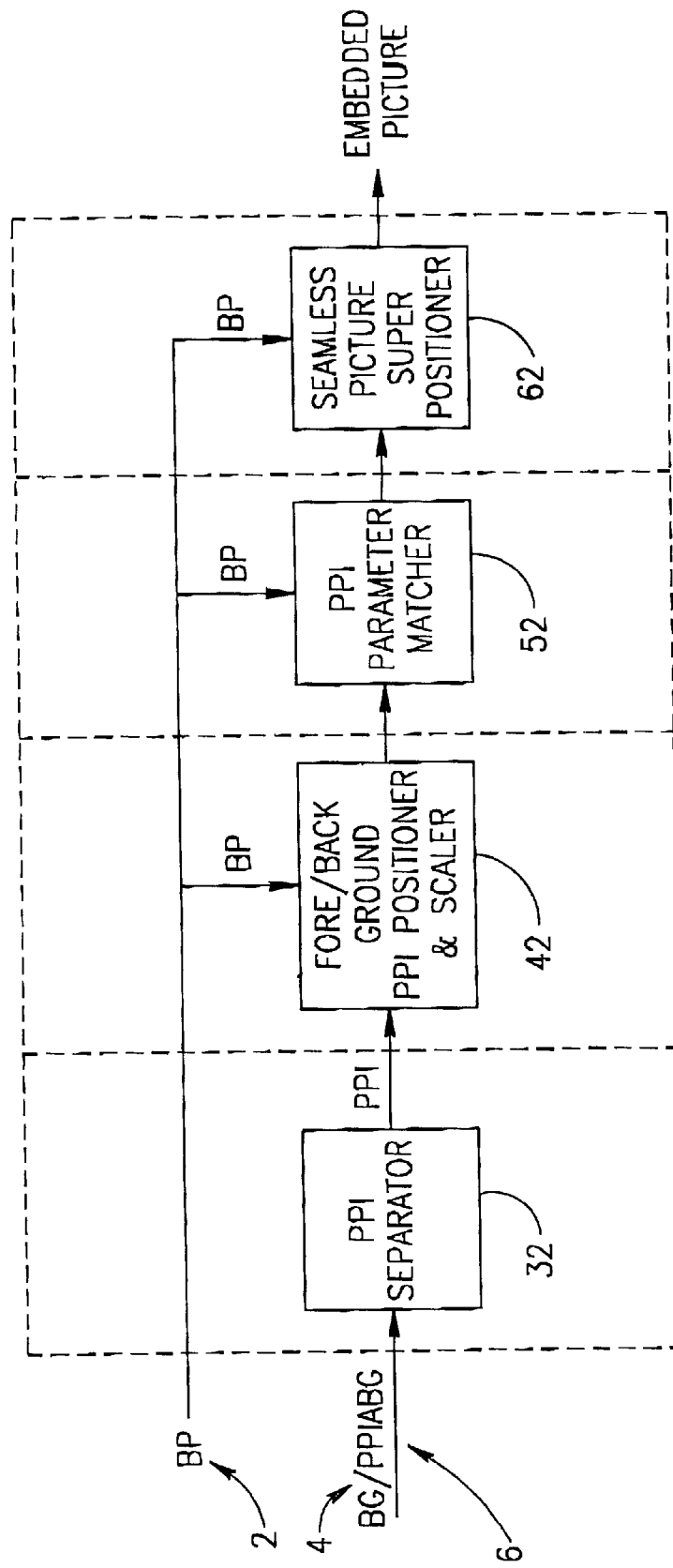
FIG. 2 is a block diagram illustration of a picture superpositioner.

Reference is now made to FIG. 2 where a block diagram of the complete superposition system is presented. The system includes four different elements; a picture part of interest separator 32, a picture part of interest positioner and scaler 42, a picture part parameter matcher 52 and a seamless superpositioner 62.

The input to the system is the three types of pictures shown in FIG. 1; basic picture (BP) 2, picture part of interest in an arbitrary background (PPIABG) 6 and background (BG) 4. The three picture sources have their signals synchronized before being provided to PPI separator 32.

Background picture 4 and picture part of interest in an arbitrary background (PPIABG) 6 are provided to picture part of interest (PPI) separator 32 which uses background 4 to separate picture part of interest 8 from picture part of interest in an arbitrary background (PPIABG) 6. Picture part of interest separation includes the detection and estimation of parameters needed for selecting a picture part of interest in an arbitrary background from a real time video picture. Separator 32 transfers separated picture part of interest 8 to the PPI positioner and scaler 42.

After the PPI has been positioned and scaled by PPI positioner and scaler 42, the PPI is provided to the picture part parameter matcher 50. Basic picture 4 is sent and stored in picture part parameter matcher 52 where it is combined with picture part of interest 8. For creating natural-looking pictures when combining picture part of interest 8 and basic picture 2, parameters such as luminance, chrominance, and spatial resolution must be matched as discussed hereinbelow together with FIG. 6.

Finally, matched basic picture 2 and picture part of interest 8 are provided to a generally seamless superpositioner 62 which brings all the parameters and portions of the picture together into a generally seamless superpositioned embedded picture (EP) 10. The latter can be viewed on a monitor or recorded for viewing on a digital video disc (DVD), video cassette recorder (VCR) or some other such interface. The monitor, DVD, VCR or other type of interface is not shown in the Figure.

Figure 3:
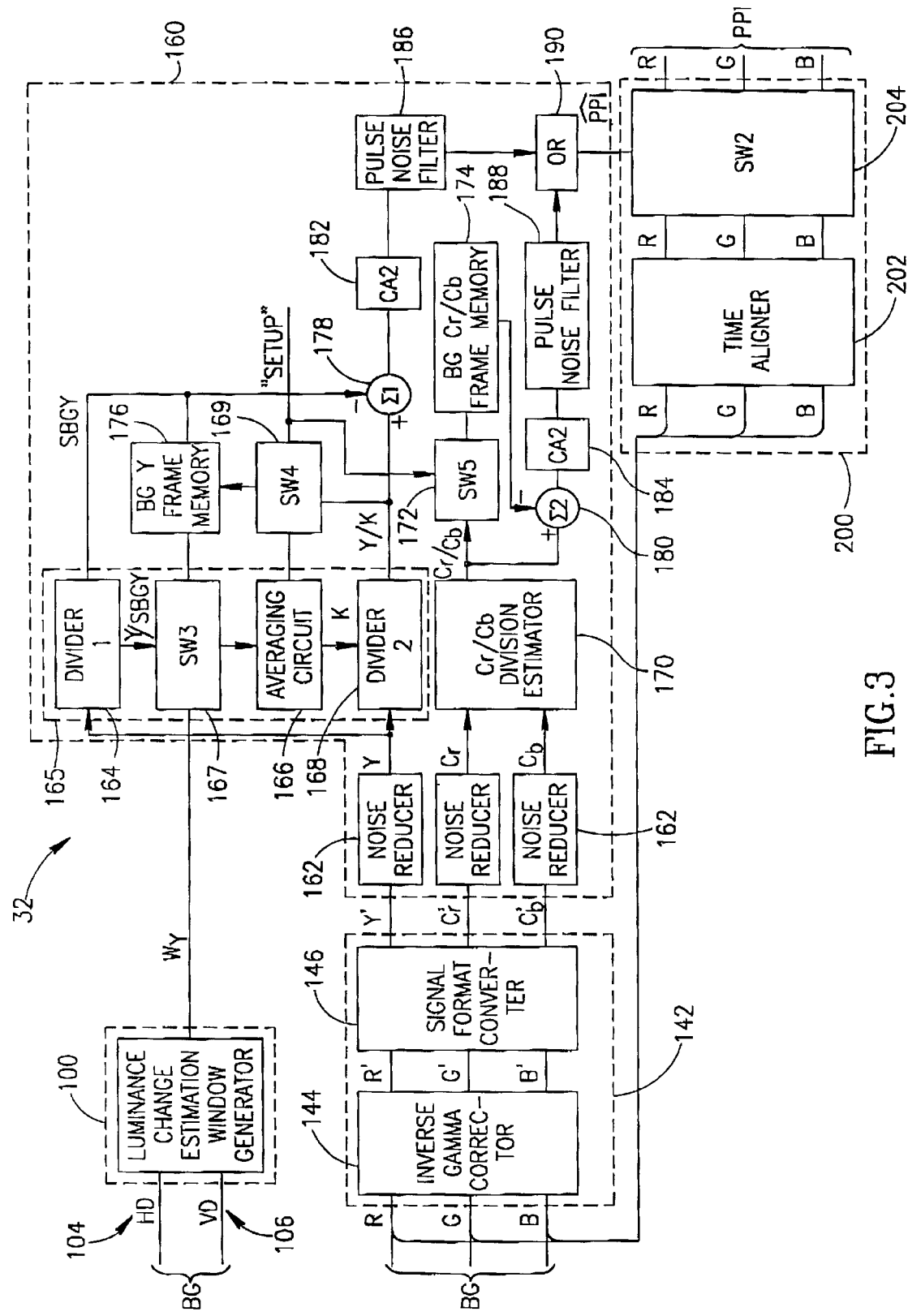
FIG. 3 is a block diagram illustration for separating the picture part of interest according to a first embodiment of the present invention.

Reference is now made to FIG. 3 where a block diagram illustration of PPI separator 32 is shown. In this first embodiment, the background BG is a still picture.

PPI separator 32 is comprised of several units, which include a window building unit 100, a PPI separator unit 200, a mask generator unit 160, and a color signal format converter unit 142. The inputs to PPI separator 32 are the red, blue and green (RBG) signals and genlocked synchronized luminance signals of a frame of the picture part of interest in an arbitrary background (PPIABG) 6.

Window building unit 100 generates a window used in compensating for variable lighting conditions when moving from frame to frame. Window building unit 100 prepares a window $W_y$ of the background luminance of the current picture part of interest in an arbitrary background (PPIABG) 6.

Color signal format converter unit 142 changes red, blue and green background (BG) signals of the current PPIABG 6 to luminance, and red and blue chrominance signals, designated as Y, Cr and Cb, respectively.

Mask generator unit 160 identifies those pixels of the current PPIABG frame which belong to picture part of interest 8 and generates a mask indicating the location of picture part of interest 8 within the frame.

Mask generating unit 160 includes a luminance compensation unit 165 that, using information from window building unit 100, permits the separation of the picture part of interest from the background even under changing light conditions by compensating for such changes. Without such compensation, changing light conditions would affect the ability of the system to discriminate between background (BG) 4 and picture part of interest (PPI) 8 in PPIABG 6.

PPI separator unit 200 obtains the PPI mask generated by mask generator unit 160 and uses it to prepare a separated PPI 8.

As discussed above, window building unit 100 generates a background luminance window from the current picture frame. This is later used by luminance compensation unit 165 in compensating for variable lighting conditions when going from one frame to another.

In window building unit 100, luminance change estimation window generator 101 builds window $W_y$ from n×n pixels of the current frame. Generator 101 is a two dimensional generator which uses vertical drive (VD) 106 and horizontal drive (HD) 104 luminance signals to generate window $W_y$. The number of pixels used should be sufficiently large to reduce the influence of noise. The window chosen for luminance estimation is generally in a corner of the frame, representative of the background of the frame and distant from the expected location of PPI 8. The window $W_y$ is then provided to a switch 167 in the luminance compensation unit 165 of mask generator unit 160.

Color signal format converting unit 142 receives RBG color signals of the current PPIABG frame and provides them to an inverse gamma corrector 144. The latter is a color signal linearization processing unit where the color signals are linearized to produce linear color signals R'B'G'. Linearization of color signals can be effected by any of several conventional linearizers known to correct for gamma, where gamma reflects the non-linear relationship between image intensity and voltage response. The linearized signals are than sent to signal format converter 146 where the R'B'G' signals are converted to luminance Y and red and blue color difference (chrominance) signals, Cr and Cb, respectively, hereinafter referred to as red and blue chrominance (Cr and Cb).

Mask generator unit 160 includes three noise reducers 162, a Cr/Cb division estimator 170 (a divider), a background luminance fame memory 176, a background chrominace division (Cr/Cb) frame memory 174, a luminance compensation unit 165, two switches 169 and 172, two summers 178 and 180, two comparators 182 and 184, two pulse noise filters 186 and 188, and a logical OR gate 190.

Luminance Y and color differences (chrominances) Cr and Cb from signal format converter 146 are delivered to noise reducers 162 where the signal to noise ratio of the signals is increased. In place of noise reducers 162, a high signal to noise ratio camera can be used as the source of the signal. Luminance Y of the current frame is then provided to luminance compensation unit 165. Luminance compensation unit 165 comprises a divider 164, an averaging circuit 166, a switch 167 and another divider 168.

Luminance Y of the current frame is provided to divider 164 where it is divided by a stored background luminance frame (SBGY) stored in and supplied by BG luminance frame memory 176. This division is done on a pixel-by-pixel basis for corresponding pixels of the current and stored frames. Background luminance frame memory 176 is activated by switch 169 through a SET UP command. The command is sent only at the outset of processing. The SET UP command results in a still image BG 4 being stored in frame memory 176.

The quotient Y/SBGY is entered via switch 167 into averaging circuit 166 where a compensation coefficient K is computed. K itself is an averaged value of Y/SBGY over the n×n pixels of window $W_y$. K is provided to divider 168 where current frame luminance Y is divided by K. Division by K compensates for luminance changes in the background of the current PPIABG frame, K is equal to one when the SET UP command is activated.

The SBGY stored in background luminance frame memory 176 is subtracted from quotient Y/K at summer 178 on a pixel-by-pixel basis. The difference comprises only the PPI luminance since the BG luminance was removed from the PPIABG luminance by summer 178. The difference is compared to a threshold value by comparator 182 also on a pixel-by-pixel basis. If the difference signal is less than a given threshold value, the difference is discarded; if greater than the threshold value, it is noise filtered by pulse noise filter 186. Noise filter 186 rids the signal of short noisy pulses and provides compared, filtered luminance differences to logical OR gate 190. The threshold level for comparator 182 is itself chosen for reducing noise in the PPI separation process.

When working with chrominance signals Cr and Cb, compensating for changes in light is unnecessary. The stored division Cr/Cb of the signals is independent of any light change once linear processing unit 144 has linearized chrominance signals Cr and Cb. The use of the chrominance signals is necessary to increase the noise immunity in the PPI separation process and in case of a shadow in the PPI.

Chrominance signals from chrominance noise reducers 162 are inputted into Cr/Cb division estimator 170 where the Cr/Cb ratio for the current frame is calculated. (By definition, hue is proportional to Cr/Cb.) This ratio is provided to background chrominance frame memory 174 which in turn is controlled via switch 172 by the SET UP command. In background chrominance frame memory 174, a frame chrominance ratio value (SBG(Cr/Cb)) for the background frame is stored. A chrominance difference is calculated at summer 180 where the stored BG chrominance value is subtracted from the calculated Cr/Cb ratio of the current PPIABG frame.

As with the luminance difference, the chrominance difference is compared to a threshold value by comparator 184. If the difference does not exceed a threshold value, the chrominance signal is discarded; if the difference exceeds the threshold, the signal is filtered by pulse noise filter 188 and fed to logical OR gate 190. Logical OR gate 190 then uses the accepted compared chrominance signals together with the accepted luminance signals received from pulse noise filter 186 and discussed above to generate the mask of the PPI. The generation of a mask occurs if either the luminance signal difference or the chrominance signal difference exceeds its threshold; both need not exceed their thresholds simultaneously. The output of logical OR gate 190 is a PPI mask, a pixel by pixel representation showing the presence or absence of a PPI.

The RBG signals of the current PPIABG frame are sent to time aligner 202 in PPI separator unit 200. Alignment is required because of the different path lengths traveled by the original signal and the signal carrying the PPI mask. The time aligned signal is fed to switch 204 where it is joined with the PPI mask provided by logical OR gate 190. Switch 204 then generates a separated PPI image using the PPI mask and the time aligned color signals.

Figure 4A:
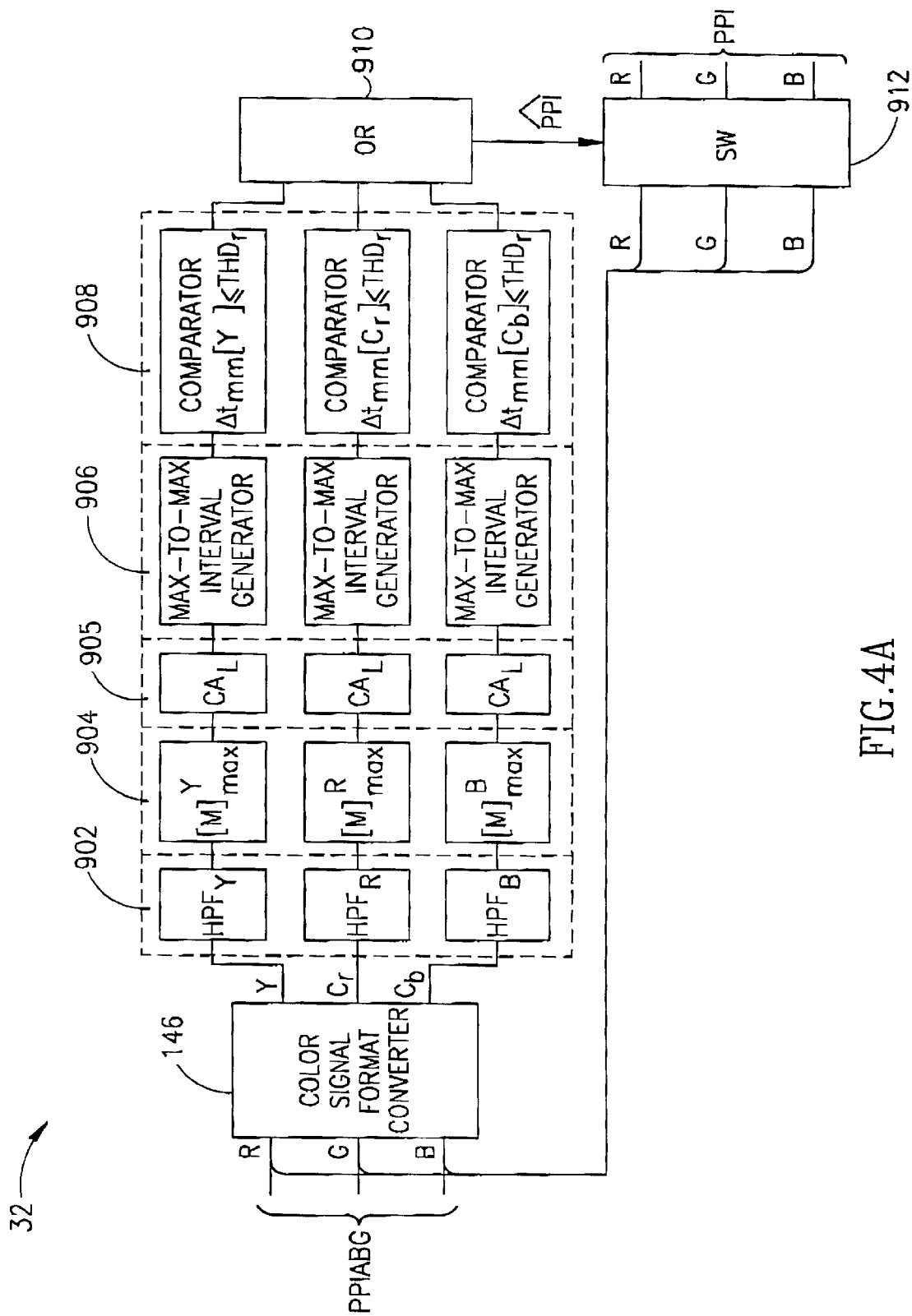
FIG. 4A is a block diagram illustration for separating a picture part of interest according to a second embodiment of the present invention.
Figure 4B:
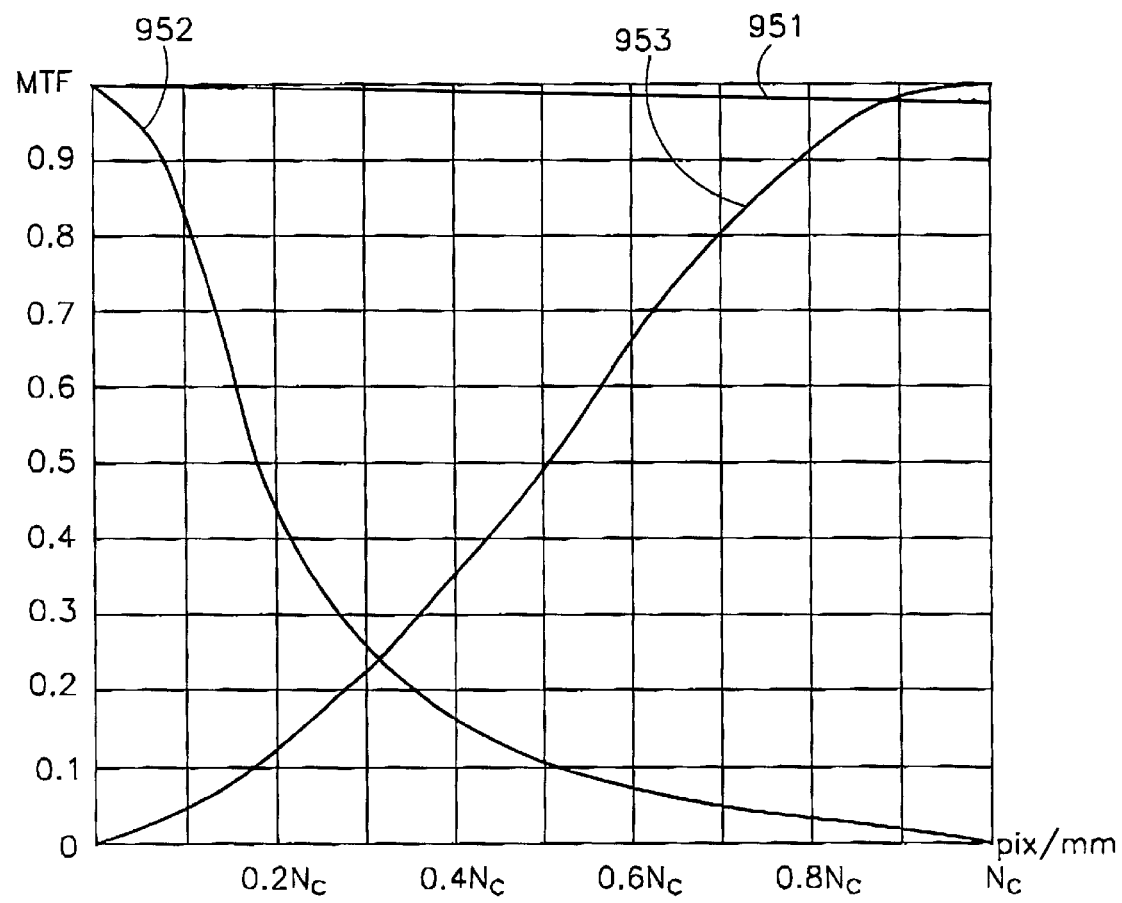
FIG. 4B is a graphical illustration of a modulation transfer function for focussed and unfocussed images useful in understanding the operation of the high pass filters of FIG. 4A.
Figure 4C:
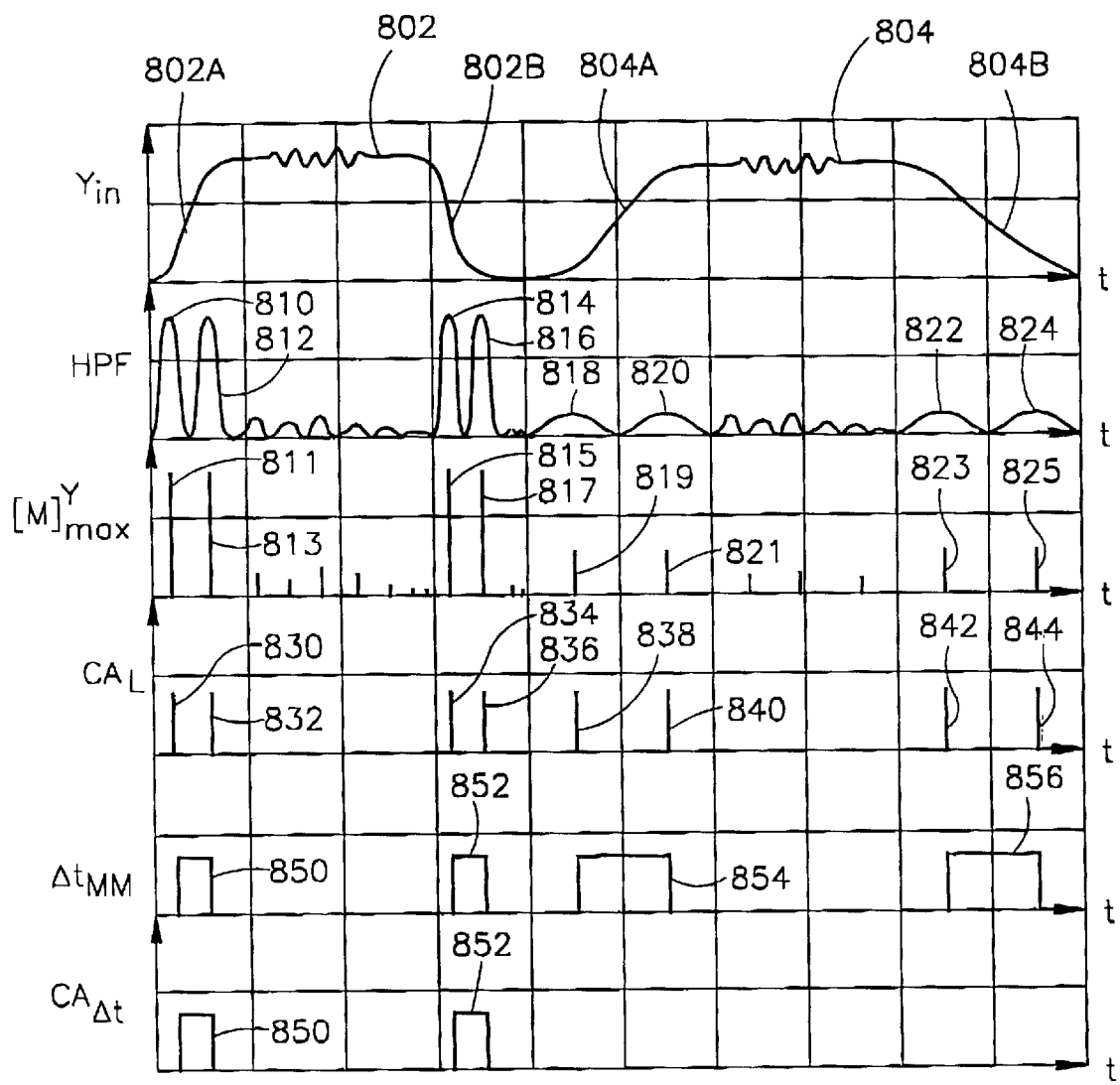
FIG. 4C is a graphical illustration showing the results effected by the components of the embodiment shown in FIG. 4A.

Reference is now made to FIGS. 4A, 4B and 4C where a second method for separating picture part of interest (PPI) 8 from PPIABG 6 is shown. Unlike the previous method discussed with respect to FIG. 2, this method can also be used with moving images as well as still image backgrounds. In this case, PPI separation is based solely on spatial resolution differences between the BG and PPIABG. Generally, the PPI is located in the focal plane and in-focus while the BG (moving or still) image is generally outside the focal plane and out-of-focus. Since PPI is a generally clear image while BG is generally a blurred one, they have very different spatial resolutions. The processing is usually done on a pixel by pixel basis, although a group of pixels can also be processed together.

FIG. 4A illustrates a second embodiment for PPI separation according to the present invention. It comprises a color signal converter 146, a plurality of high pass filters 902, a plurality of pulse signal maximum estimators 904, a plurality of level comparators 905, a plurality of maximum-to-maximum time determiners 906, a plurality of comparators 908, a logical OR gate 910, and a switch 912.

In FIG. 4A, RBG input signals have their formats converted to Y, Cr and Cb by color signal format converter 146. Each of the signal components Y, Cr and Cb is provided to its own high pass filter 902.

FIG. 4B illustrates camera modulation transfer functions for focal (graph 951) and non-focal planes (graph 952) as well as the response of high pass filters. The figure presents modulation transfer functions 951 and 952 as a function of the number of pixels per mm for focussed (image at the focal plane) and blurred (image not at the focal plane) images, respectively. The figure also indicates, with graph 953, that a high pass filter can be used to distinguish sharp and blurred images at the high end of the pixel/mm scale since in that region of the graph (i.e. above $0.6N_c$), only high resolution signals, i.e. those in the focal plane, pass the filter.

Returning to FIG. 4A, after the signal has been filtered by HPFs 902, it is sent to a pulse signal maximum estimator 904 where the pulse signal maximum and the temporal location of the pulse signal maximum of a luminance (and separately the Cr and Cb) signal are determined. Maximum estimator 904 provides the signal maximum to comparator 905 where the signals are compared to a predetermined root-mean-square threshold noise level. All pulse signal maxima on the order of the background noise are discarded. The accepted signals are then fed to maximum-to-maximum time determiner 906 where the time difference $\Delta t$ between adjacent signal maxima as determined by pulse signal maximum estimator 904 i.e. $\Delta t_{mm}[Y]$, $\Delta t_{mm}[Cr]$, and $\Delta t_{mm}[Cb]$, is determined.

The time difference $\Delta t$ between adjacent signal maxima for each pair of signal maxima is then compared with a threshold value. If $\Delta t$ exceeds the threshold value ($THD_r$), the pixel is part of a cluster of pixels which is out of focus. It is considered to be part of background BG and dropped. If $\Delta t$ is less than the threshold value, the signal is part of an in-focus region and is related to the PPI. It is considered to be related to the PPI and is retained. The retention conditions are $\Delta t_{mm}[Y] \leq THD_r$, or $\Delta t_{mm}[CR] \leq THD_r$, or $\Delta t_{mm}[CB] \leq THD_r$. The retained values—the output of the comparator—are then input to a logical OR gate 910. Gate 910 generates a PPI mask if at least one of the Y, Cr or Cb signals has met the retention conditions and transfers the mask to switch 912. Switch 912 produces the R, B and G signals of a PPI.

FIG. 4C shows, in a series of graphs 1–5, the effect of the various elements in the PPI separation method illustrated in FIG. 4A. The series of graphs refers only to the luminance signal. Graph 1 shows the input luminance for two images, an in-focus image 802 on the left and a blurred image 804 on the right. In-focus image 802 has sharp edges 802A and 802B, whereas blurred image 804 has broader diffused edges 804A and 804B.

Proceeding to graph 2 of FIG. 4B, the effect of high pass filter (HPF) 902 on the original luminance signal Y is shown. The edges of the signals in graph 1 are each split into signal doublets, i.e. 810 and 812, 814 and 816, 818 and 820 and 822 and 824. The blurred edges have broader doublets with lower amplitudes.

Graph 3 of FIG. 4B shows the position of the maximum of luminance Y in graph 2 as a function of t as computed by module estimator 904. The duration between pulse signal maximum positions in the third graph is shown as $\Delta t$. The duration $\Delta t$ between the maxima of the sharp edges of in focus image 802 is smaller than the separation of the maxima of blurred images of image 804.

Graph 4 shows $\Delta t$ between Y maxima as a function of time t for the corresponding elements of graph 3 figures after treatment by maximum-to-maximum to time determiner 906 of FIG. 4A. Finally, graph 5 shows the effect of comparator 908 of FIG. 4A on luminance signal Y. Comparator 908 cuts off all filtered signals with a $\Delta t$ above a given threshold value, THD leaving only those for in-focus image 802.

Figure 5:
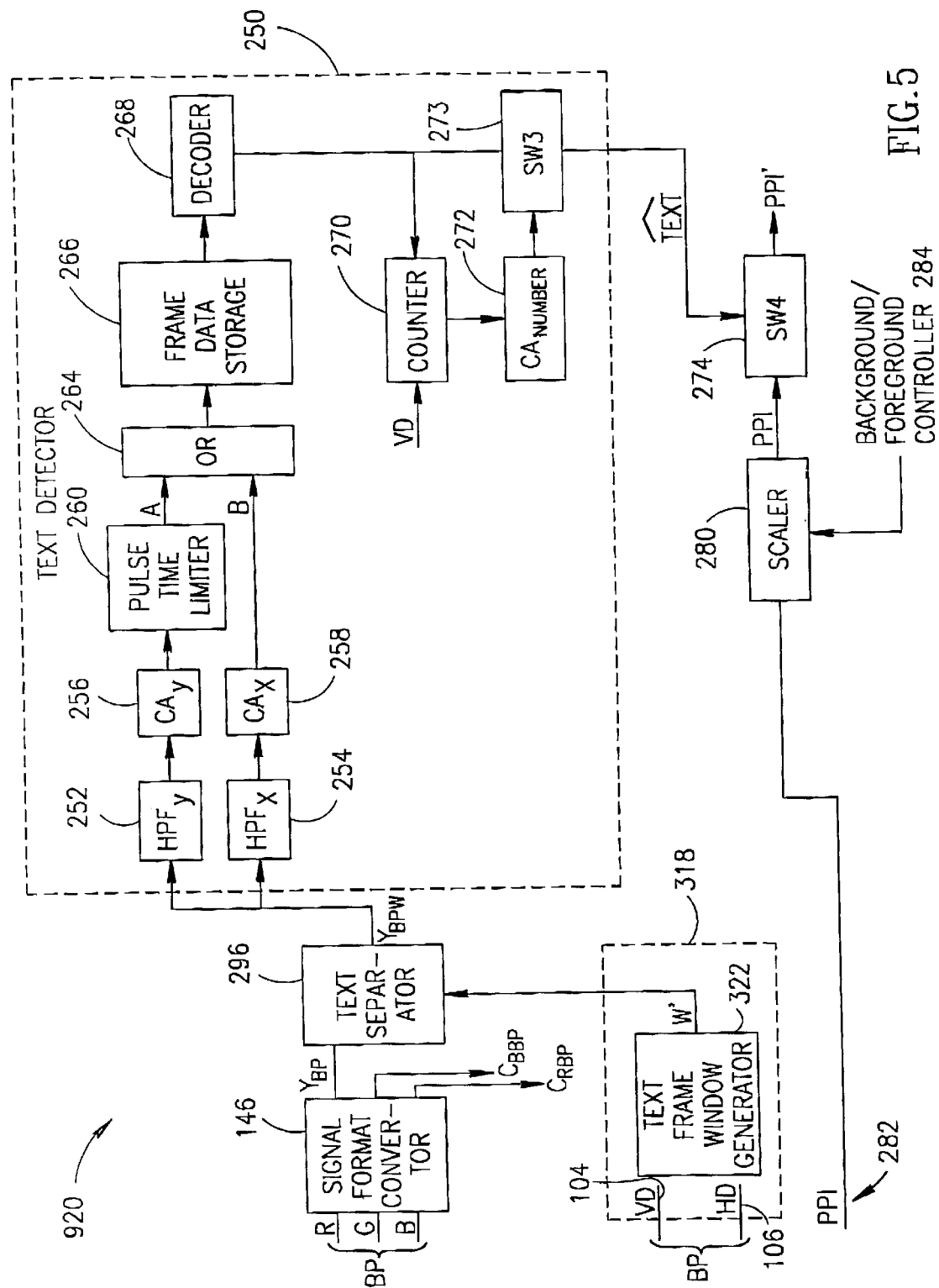
FIG. 5 is a block diagram illustration of a positioner and scaler for positioning a text and scaling a picture part of interest according to the present invention.

Often, picture superposition requires locating a text in a basic picture and embedding a PPI into the basic picture. Reference is now made to FIG. 5 where a basic picture text foreground positioner and a PPI scaler unit 920 is shown. Unit 920 comprises a text detector unit 250, a color signal format converter 146, a text frame window generator 322, a text frame separator 296, a scaler 280 and a switch 274.

Text detector 250 is further comprised of two high pass filters 252 and 254, two comparators 256 and 258, a pulse time limiter 260, a logic OR gate 264, a frame data storage unit 266, a decoder 268, a counter 270, another comparator 272 and a switch 273.

The system in FIG. 5 is suitable for locating text (subtitles, karaoke, etc) in a BP and inserting a PPI into the BP containing the text. The text can be generated directly into the BP from a computer or other text generator. The video signal of text generated in such a manner has very sharp, short time edges relative to edges of pictures, often on the order of 50 times shorter than picture edges. A time edge refers to the time required for the signal to rise and attain its maximum. The time for text edges is much more rapid than for picture edges.

Generally, positioner and scaler unit 920 works as follows. Color signal format converter 146 converts the color signals RBG of basic picture BP into Y, Cr and Cb signals. Text frame window generator 322 receives genlocked vertical 104 and horizontal 106 drive signals that are synchronized BP input signals and generates a text window w'. The text window w' identifies the position in BP where the text will be superpositioned. Window w' is provided to text separator 296 which separates out the luminance signals of text window w' of BP. Text detector unit 250 generates a text mask from window w' for superposition with a scaled PPI at switch 274. Scaler 280 effects the scaling of the picture part of interest (PPI).

Unit 920 will now be discussed in greater detail. Similar to FIG. 3, color signals of a basic picture are inputted as RGB signals. Color signal format converter 146 changes these signals into luminance and chrominance signals. As indicated in the Figure, the luminance signal alone is sufficient for text positioning and text mask generation.

The basic picture luminance Ybp is provided to text frame separator 296. Text frame separator 296 also receives text window w' from text frame window generator 322.

Text frame separator 296 produces a luminance signal Ybpw for text window w' of BP. This latter luminance signal is provided to text detector unit 250 where it is sent to horizontal (x) and vertical (y) high pass filters (HPFs) 252 and 254 respectively and from there to x and y comparators 256 and 258. HPFs 252 and 254 separate text from pictures based on the fact that text has sharper edges, with more contrast, than edges of objects in images.

The signals are sent to comparators 256 and 258 where the luminance signal values are compared to a threshold value e.g. 50% of the signal maximum. If the luminance signal components do not exceed threshold values, they are discarded; if they exceed a threshold value, the y component is input to a pulse time limiter 260. The x and y components are then provided to a logical OR gate 264. Comparators 256 and 258 locate the edge of the text signal, while pulse time limiter 260 shortens the pulses to the duration of a single pixel.

The OR gate 264 takes luminance signals with small details, i.e. sharp edges such as text edges, and sends them to frame data storage unit 266. In the storage unit 266, data from the comparator 254 is stored on a pixel-by-pixel and per frame basis. The stored data is then fed to decoder 268 where the data is decoded in FIFO fashion. Decoder 268 determines the number of consecutive frames having text in corresponding pixel positions. If the number of consecutive frames exceeds a predetermined threshold value, a subtitle has been located. About 30 to 50 frames are required for a reliable determination that text is present.

The pixel-by-pixel data is transmitted to switch 273 and counter 270. Counter 270 also receives vertical drive signal input that resets the count when a new frame is encountered. Counter 270 counts the number of pixels in a frame containing text. This data is sent to comparator 272 which determines if the number exceeds a given value. If it does, text is present and the corresponding pixels are input to switch 273. If not, the frame is assumed not to contain text. In effect, counter 270 is a threshold determiner for determining text.

Switch 273 produces a text mask based on the pixel data it receives from decoder 268 and passes the text mask from text detection unit 250 to switch 274. Switch 274 also receives a scaled PPI signal from scaler 280. Scaler 280 typically uses commercially available circuits. The scaled PPI is a scaled version of the separated PPI received from PPI separation unit 30 of FIG. 3. Scaler 280 operates under the control of a background/foreground controller which determines the size of the PPI needed in relation to text. Typically, the PPI is large in the foreground and small in the background. The output produced by switch 274 is a PPI with an embedded text image.

Figure 6:
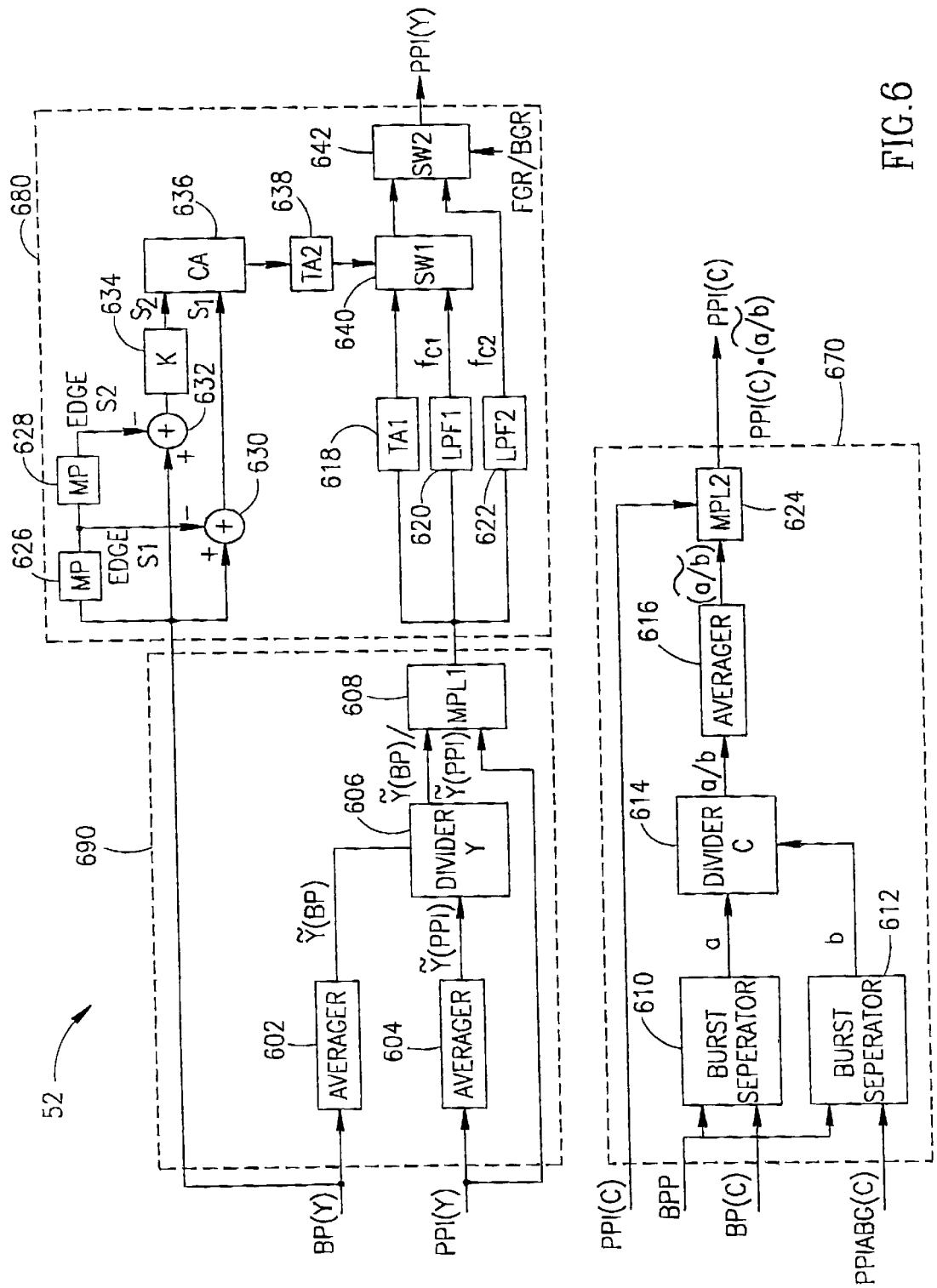
FIG. 6 is a block diagram illustration of a parameter matcher for matching parameters of the basic picture with those of a picture part of interest according to the present invention.

For natural looking images in superpositioned pictures, the PPI 8 and BP 4 must have their luminance and chrominance values matched. Reference is now made to FIG. 6 where a picture parameter matching system 50 according to the present invention is shown. Luminance, chrominance and spatial resolution are matched in matching system 50. Spatial resolution in this context refers to matching the focussed and unfocussed portions of the different source pictures 20, BP 2 and PPI 8, so that they can be merged to form embedded picture EP 10.

Picture parameter matching system 50 includes three parts; a luminance matching unit 690, a chrominance matching unit 670 and a spatial resolution matching unit 680.

Luminance matching unit 690 comprises two averaging units 602 and 604, a divider 606 and a multiplier 608. Basic picture luminance signal BP(Y) is sent to averager 602 where the signal is averaged over time. Averager 602 generates an average luminance of the basic picture [ave Y(BP)] which is then provided to divider 606. The PPI luminance signal PPI(Y) is sent to averager 604 where it averages PPI(Y) over time and generates [ave Y(PPI)] which is also provided to divider 606, Divider 606 calculates [ave Y(BP)/ave Y(PPI)] which is fed to multiplier 608. Multiplier 608 multiplies PPI(Y) by [ave Y(BP)/ave Y(PPI)] with the result provided to spatial resolution matching unit 680. It should be readily apparent that luminance matching unit 690 effectively reduces or magnifies the luminance of PPI in such a way that it equals the luminance of the BP.

In order to match basic picture BP to the PPI, spatial resolution matcher 680 must also be applied to BP(Y). The BP(Y) signal is provided to summer 630 of spatial resolution matcher 680. It also is provided to memory pixel 626 which delays BP(Y) by one time unit and then transfers it to summer 630. At summer 630, a luminance difference S1 is calculated between the original and delayed signal and then provided to comparator 636.

BP(Y) is also sent through two memory pixels 626 and 628 that delay BP(Y) by two time units. This twice delayed BP(Y) signal arrives at summer 632 where a difference S2 is calculated between the twice-delayed signal and the original BP(Y) is signal. Difference S2 is multiplied by an empirically determined factor, typically around 0.8, by multiplier 634 and provided to comparator 636. This factor is used to increase the tolerance of the system.

The twice-delayed signal is shifted to the right on a signal versus time curve with respect to the once delayed signal. The edges of the original focussed and delayed focussed signals are sharp and of a relatively short duration. Thus the magnitude of the difference noes of the once S1 and twice delayed S2 focussed signals should be generally equal.

If the signal being delayed is an out-of-focus image signal, the edges are broad. For the signal of an out-of-focus image, the difference S1 between the once delayed and non-delayed signal is smaller than the difference S2 between the twice-delayed S2 and non-delayed signal. For focussed images, the amplitude of the twice-delayed difference signal S2 is generally identical to that of the once delayed signal difference signal S1 since an edge duration of a focussed image is on the order of one time delay unit.

Comparator 636 determines if the signal is from a focussed image (S2=S1) or an unfocussed image (S2>S1). (The case where S1>S2 is physically impossible). If the first condition is true, comparator 636 sends a pulse to time aligner 638 and from there to switch 640. If the second condition is true, no pulse is sent to time aligner 638, While the above comparison of the BP luminance signal is made, luminance unit 690 sends the matched and multiplied luminance signal PPI(Y).[ave Y(BP)/ave Y(PPI)] from multiplier 608 to time aligner 618. The time aligner 618 sends the now time aligned signal now time aligned to switch 640. The multiplied matched luminance signal is also sent to low pass filters (LPF) 620 and 622. Switch 650 uses the signal from LPF 620 when the basic picture BP has broad edges; in such a case the PPI generally has sharper edges than the BP. If a PPI is to be placed into a blurred BP background, the PPI signal from LPF 622 is provided to switch 642.

Comparator 636 provides switch 640 with the information on the relationship between S2 and S1. If S2=S1, switch 640 passes the signal received from time aligner 618 on to switch 642. If S2>S1, switch 640 provides the signal received from LPF 620 to switch 642.

Whether switch 642 accepts the signal from switch 640 or from LPF 622 is determined by a foreground/background controller. The latter controls switch 642 which chooses the correct input information to use in generating a PPI(Y) with matched luminance and spatial resolution properties. If the PPI is in the foreground, a signal from switch 640 is used; if it is in the background the signal is taken from LPF 622.

It will be appreciated by persons skilled in the art that the present invention is not limited by what has been particularly shown and described herein above. Rather the scope of the invention is defined by the claims that follow:

What is claimed is:

1. A method for image processing of a frame, the method comprising the step of:
   separating a picture part of interest from said frame, wherein said frame has an arbitrary background, wherein said step of separating comprises the steps of:
      receiving a background frame having said arbitrary background;
      receiving an input frame having said picture part of interest within said arbitrary background; and
      separating said picture part of interest from said arbitrary background using said input and said background frames
   wherein said step of separating further comprises the steps of:
      filtering an input signal;
      estimating the pulse signal maximum of said filtered input signal;
      determining the time difference between adjacent pulse signal maxima of said input signal;
      comparing said time difference to a threshold value; and
      accepting a signal for use as part of a picture part of interest mask if said signal is below said threshold value, wherein said above steps generally are applied separately to the luminance, red chrominance and blue chrominance components of said input signal.

2. A system for separating a picture part of interest of an input frame, the input frame having an arbitrary background, said system comprising:
   a mask generating unit for generating a picture part of interest mask using the difference between chrominance and luminance signal values in said input frame and an arbitrary background frame; and
   a separator unit for separating a picture part of interest from said input frame using said picture part of interest mask
   wherein said mask generating unit further comprises:
      a background luminance frame memory for providing a background luminance signal;
      a first divider for dividing luminance signals from an input frame and a memorized background luminance signal (quotient A), said memorized background luminance being provided by said background luminance frame memory;
      a second switch receiving a luminance window from a window pulse generator unit and quotient A from said first divider;
      an averaging circuit for calculating an estimated light change coefficient K by averaging quotient A over the pixels of said luminance window;
      a second divider for detecting changes in the input frame luminance signal by dividing an input frame luminance signal by said light change coefficient K (quotient B); and
      a first summer for subtracting said quotient B from said memorized background luminance signal.

3. A system according to claim 2 wherein said mask generating unit further comprises:
   a background chrominance frame memory for providing a memorized BG chrominance ratio signal, said memory set up by a switch;
   a divider for dividing red and blue chrominance signals (quotient C), said chrominance signals received from a color unit; and
   a summer for subtracting said quotient C from said memorized background chrominance ratio signal.

4. A system for separating a picture part of interest of an input frame, the input frame having an arbitrary background, said system comprising:
   a mask generating unit for generating a picture part of interest mask using the difference between chrominance and luminance signal values in said input frame and an arbitrary background frame; and
   a separator unit for separating a picture part of interest from said input frame using said picture part of interest mask
   wherein said separator unit comprises:
      a time aligner for aligning color signals of said input frame; and
      a switch receiving said time aligned input frame color signals, and a picture part of interest mask from said mask generating unit, said switch thereby generating a picture part of interest from said mask and said color signals.

5. A system for separating a picture part of interest from an input frame having an arbitrary background, said system comprising:

at least one high pass filter for determining the edges of an input signal of said picture part of interest within said arbitrary background;

at least one pulse signal maximum estimator for determining the time maxima of said filtered input signal;

at least one maximum-to-maximum time determiner for determining the time difference between consecutive signal maxima;

at least one comparator for comparing said time difference with a predetermined threshold value; and an OR gate for generating a picture part of interest mask from signals received from said at least one comparartor.

6. A system according to claim 5 wherein said system processes the luminance, red chrominance, and blue chrominance signals of said input signal separately, each of said signals being processed by its own high pass filter, pulse signal maximum estimator, time determiner, and comparator.

* * * * *